United States Patent [19]
Mitch

[11] Patent Number: 5,414,779
[45] Date of Patent: May 9, 1995

[54] IMAGE FRAME DETECTION

[75] Inventor: John Mitch, Webster, N.Y.

[73] Assignee: Eastman Kodak Company, Rochester, N.Y.

[21] Appl. No.: 76,592

[22] Filed: Jun. 14, 1993

[51] Int. Cl.⁶ .............................................. G06K 9/00
[52] U.S. Cl. .................................... 382/199; 382/276; 382/291; 355/41; 358/506; 354/218
[58] Field of Search ................ 356/429; 250/559, 560, 250/561, 571; 382/8, 9, 56, 1, 48; 358/506, 136, 133, 213.27; 375/122; 348/140; 355/122, 123, 126; 354/217, 218

[56] References Cited

U.S. PATENT DOCUMENTS

| | | | |
|---|---|---|---|
| 4,281,344 | 7/1981 | Mounts et al. | 358/136 |
| 4,591,908 | 5/1986 | Hirano | 358/136 |
| 4,651,199 | 3/1987 | Alkofer | 358/506 |
| 4,698,672 | 10/1987 | Chen et al. | 358/136 |
| 4,704,628 | 11/1987 | Chen et al. | 358/136 |
| 4,704,633 | 11/1987 | Matsumoto | 358/213.27 |
| 4,725,885 | 2/1988 | Gonzales et al. | 375/122 |
| 4,947,205 | 8/1990 | Benker et al. | 355/41 |
| 5,150,209 | 9/1992 | Baker et al. | 358/133 |
| 5,151,949 | 9/1992 | Miyata | 382/56 |
| 5,157,482 | 10/1992 | Cosgrove | 358/54 |
| 5,223,926 | 6/1993 | Stone et al. | 382/56 |

Primary Examiner—Yon J. Couso

[57] ABSTRACT

Locations of respective image frames contained on an image recording, such as a continuous color photographic film strip scanned by digitizing opto-electronic scanner are identified by storing scanline data produced by the scanner in a digital database, and processing the stored scanline data to generate a predictor space which is used to identify locations of all the minimally valid frames. Thereafter, the well formed image frames are used to produce statistics which are used to detect the location of other frames.

17 Claims, 9 Drawing Sheets

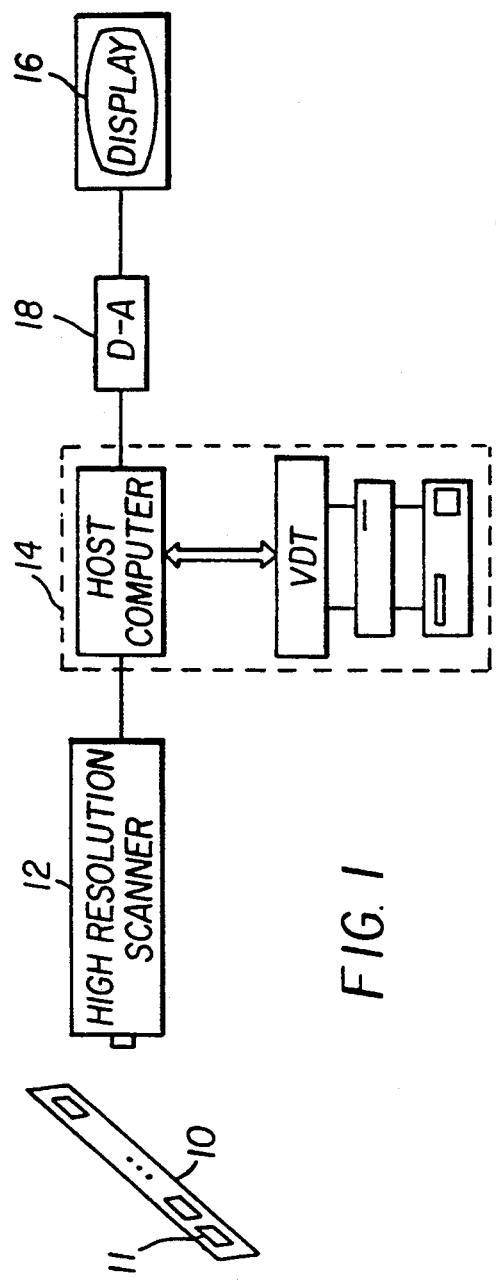
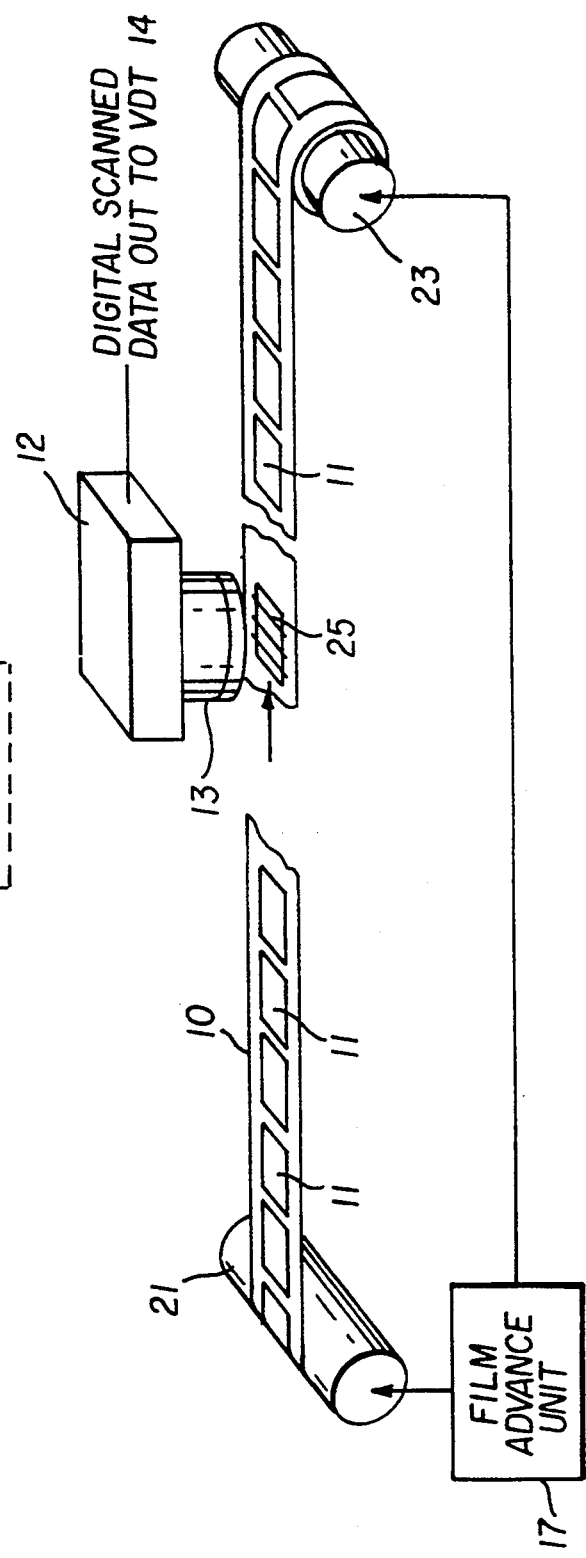
FIG. 1
FIG. 2

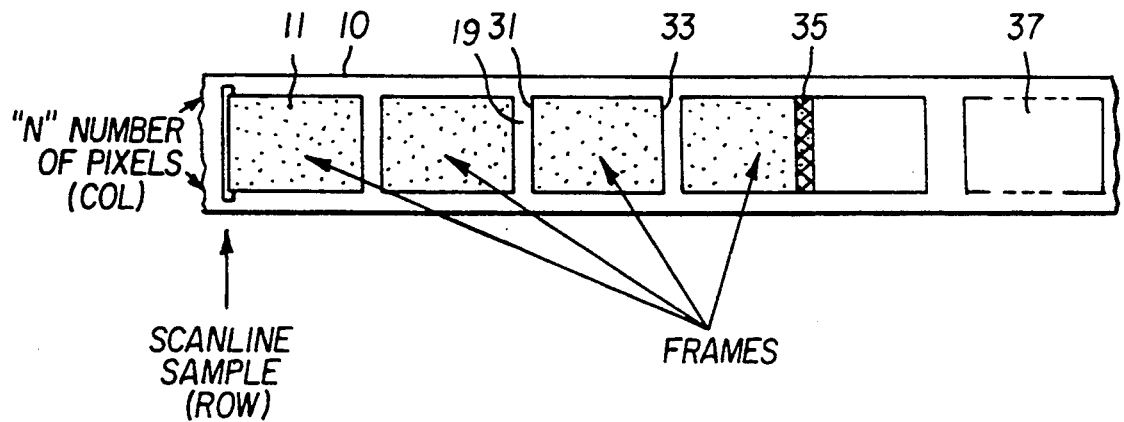
FIG. 3
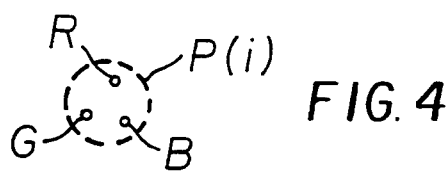
FIG. 4
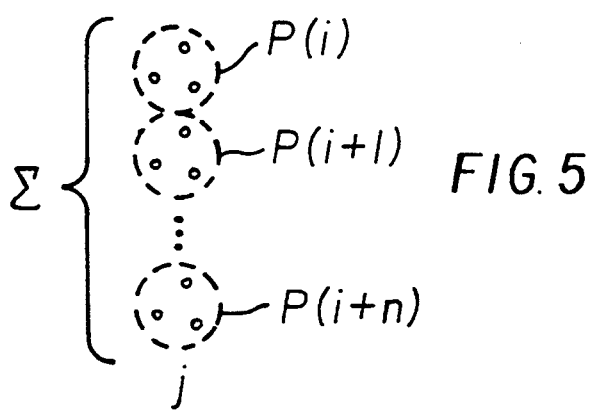
FIG. 5
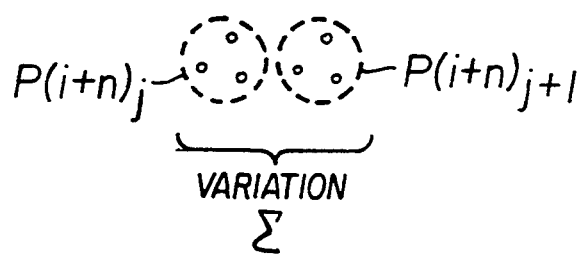
FIG. 6

101 — Eliminate any open gate scanlines at the beginning and end of the film order
103 — Create the Predictor arrays:
    Allocate the memory for the statistical predictors array
    Generate the stat predictors
105 — If positive film, normalize stat predictor by inverting the data
107 — Else it's negative film, generate stat predictor in normal fashion
    Allocate the memory for the Delta arrays
111 — Generate the Next Delta predictor
    Generate the Previous Delta predictor
113 — Install the defaults for uninitialized configuration settings
    Determine which scanlines should not be included in the generation of the histogram
115 — Generate a histogram for each predictor set
117 — Determine each adaptive threshold based on the configuration and histograms

*FIG. 10*

```
If
    RegionSize < (2 x FrameMaxSize) and
    RegionSize >= (1.5 x FrameMaxSize)
then
    label region overlap25
```

```
If
    RegionSize < (1.5 x FrameMaxSize) and
    RegionSize >= (1.25 x FrameMaxSize)
then
    label region overlap50
```

```
If
    RegionSize < (1.25 x FrameMaxSize) and
    RegionSize > (FrameMaxSize)
then
    label region overlap75
```

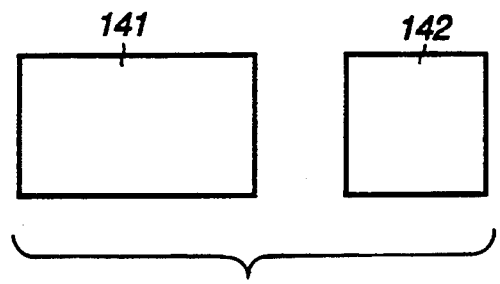
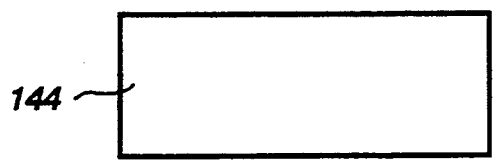
*FIG. 21*
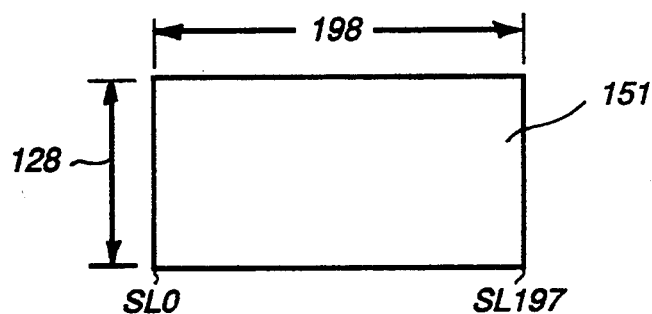
*FIG. 22*
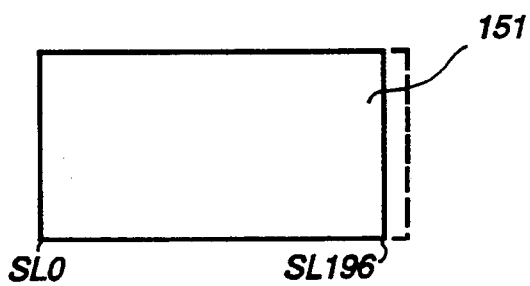
*FIG. 23*
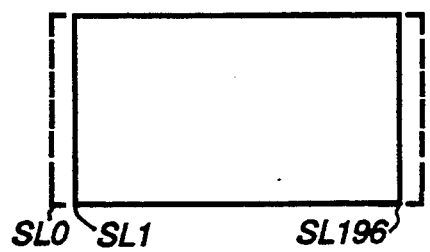
*FIG. 24*

IMAGE FRAME DETECTION

FIELD OF THE INVENTION

The present invention relates to image processing systems and is particularly directed to a frame detection mechanism for locating the positions of respective image(s).

BACKGROUND OF THE INVENTION

Automated photographic film handling processes, such as film scanning and printing processes, require the ability to accurately position the film at the location of each exposure (image frame). For example, photofinishing systems customarily prescan a strip of (35 mm) color film to examine the quality and color content of the respective image frames prior to transferring the images to print paper. On the basis of this prescan examination, exposure control parameters of the scanning optics components are defined so that, during a second pass of the film, the projection of each image onto the print medium will be properly adjusted to yield an acceptable quality hard copy print.

In order to accurately identify where each image is located, it is conventional practice to form respective notches along the edge of the film, for example between successive frames, or centrally of each frame. When the film is rescanned, these notches are used to identify successive frames for rescanning of optical printing. A shortcoming of such an exposure control procedure is the fact that a notch is sometimes missed or mislocated. When this happens, a mismatch between the current image frame and prescan-derived exposure control parameters can occur. The result is a poor quality set of prints, making it necessary for the photofinisher to reprocess the film strip, which entails additional time, and costs associated with the wasted print materials. Although a minor lag in processing can be adequately managed, when a large reel of film is to be scanned continuously on a single machine and then printed on the same (or other) machine, it is too complex to track and detect possible sequence errors.

One attempt to remedy this notch misalignment problem, described in the U.S. Patent to Benker et al, No. 4,947,205, is to make use of the film density change occurring at interframe gaps between successive image frames. In accordance with the system described in the '205 patent, film density change measurements are conducted in order to compensate for 'slippage' between the film strip transport reels and the film strip itself. A counter is operative, in conjunction with film transport notches along the sides of the length of the film, to provide an indication of film advance, and it is assumed that well formed image frames are properly spaced apart by periodically spaced (Dmin) interframe gaps. When the film strip is rewound in preparation for a rescan, the output of a film density monitoring circuit, which looks for interframe gaps, is compared with the notch counter. If the two do not coincide, then it is inferred that slippage has occurred and the position of the film is adjusted to compensate for the difference.

Unfortunately, it is not always the case that successive images on a continuous film strip are equally spaced apart from one another, nor is it always the case the content of an image frame immediately adjacent to an interframe gap is at a signal modulation level different from Dmin. Indeed, it often occurs that two or more image frames on a film strip to be processed overlap each other (a condition that may occur if the film has been rewound by the camera user, for example). Also, the captured image (modulance) contents of an image frame may be such that the modulance cannot be distinguished from non-exposed (interframe-gap) portions of the film (for example, a night-time fireworks image, where the principal portion of the image frame surrounding the fireworks display is effectively in darkness). In this latter case, the interframe gap and the image frame itself effectively blend together.

SUMMARY OF THE INVENTION

It is therefore an object of this invention to provide an improved method of frame detection whether or not the frames are well formed.

This object is achieved in a method of detecting the locations of respective image frames contained on an image recording medium, comprising the steps of:

(a) scanning said image recording medium so as to produce data representative of the contents of successive scan lines of said image recording medium;

(b) processing such scan data to generate a predictor space for frame identifiers;

(c) producing a series of thresholds based upon the predictor space and a series of predetermined statistics;

(d) determining all the well formed image frames based upon the thresholds; and (e) using the determined well formed image frames to produce frame statistics which are used to detect the location of image frames other than the well formed image frames.

ADVANTAGES

By utilizing the complete order, various statistics pertaining to the film order permit the invention to adapt to the characteristics of each film order which affects the ability to determine the location of the exposed frames of the order. This allows the frame detection algorithm to better contend with the varying frame lengths, varying film types, and varying film exposures.

By using non-monotonic reasoning the algorithm can iteratively determine more details about the film order through each phase of its analysis. This allows greater sensitivity, increasing its effectiveness in finding the edges of the exposed frames. Fewer frames are lost with this method thus improving yield and reducing the amount of manual intervention required.

Operating within the predictor space reduces the amount of data to be inspected during the frame line logic portion of the algorithm thus reducing the time required to perform the analysis.

Utilizing the "delta" predictors allows another form of adaptation by looking at the differences of adjoining scanlines. This also improves the sensitivity of the algorithm for detecting the edges of the exposed frames.

Allowing gap-like densities (Dmin) to be treated as edges of frames improves yield and misregistered frame handling.

The present invention provides a more accurate and dependable design to determine frame positions of a digitally scanned film.

Edge detection technique according to the present invention provides a more truer evaluation of frame edges which leads to much improved tuning as well as detection, especially in dealing with a short original piece of film containing images (short chop).

The present invention has improved tuning aspects of frames (tuning referring to frame size regulation) reported by utilizing how the frame was extracted from a particular piece of film (film order).

The present invention is particularly suitable for use for those film orders which have a few frames such as one or two.

By using a particular method of changing thresholds the present invention can readily compensate for under and over exposed images.

BRIEF DESCRIPTION OF THE DRAWINGS

FIG. 1 diagrammatically illustrates a digital image processing system for processing photographic color images, such as those captured on a continuous strip of color photographic film;

FIG. 2 diagrammatically illustrates the transport of a film strip in the course of its being scanned by the system of FIG. 1;

FIG. 3 diagrammatically illustrates the manner in which spatially separated scanlines traverse a film strip in a direction generally transverse to its transport direction past the scanner's imaging optics;

FIG. 4 diagrammatically illustrates a pixel triad P[i] that defines a respective scanline pixel [i] within an arbitrary scanline j, comprised of a red pixel R, a blue pixel B and a green pixel G;

FIG. 5 diagrammatically shows, for a scanline j, how the value SUM represents the resultant neutral value obtained by summing the respective neutral values associated with each of the RGB triads P[i], P[i+1], ..., P[i+n] of which scanline j is comprised;

FIG. 6 shows, for a scanline j, the value VARIATION representing the absolute value of the result of summing respective differences between RGB triads of adjacent scanlines, i.e. between P[i] of scanline j and P[i] of scanline j+1, through P[i+n] of scanline j and P[i+n] of scanline j+1;

FIG. 10 is a preliminary processing flow chart diagram in which scanned data processing parameters are initialized;

FIG. 21 shows a pair of undersized regions mutually adjacent to one another, each being dimensioned less than the frame width of a maximum image frame, to be combined into a single image frame;

FIGS. 22, 23 and 24 diagrammatically illustrate the manner in which an oversized image is reduced by an iterative scanline removal sequence.

DETAILED DESCRIPTION

Figure 7:
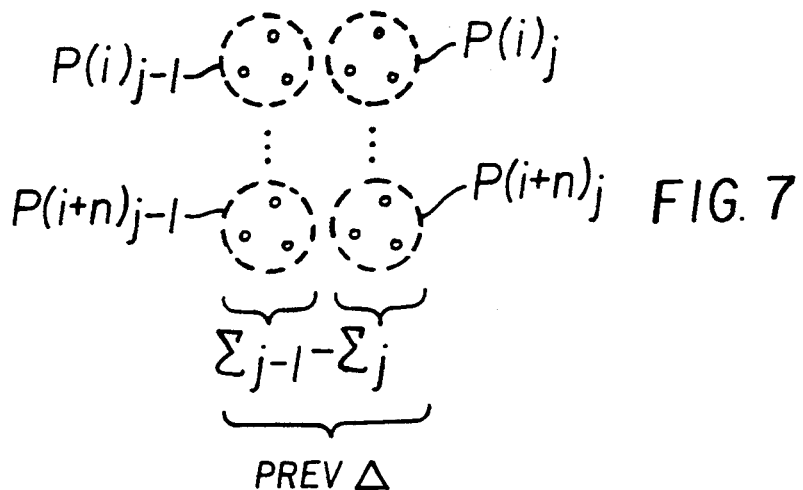
FIG. 7 diagrammatically illustrates the difference in sums for a PREVIOUS DELTA for a scanline j, as SUM[j]−SUM[j−1]

Before describing in detail the particular image frame detection in accordance with the present invention, it should be observed that the present invention resides primarily in what is effectively a prescribed augmentation of the image scanning control software employed by the control processor which operates the film scanning mechanism at the front end of a digital image processing system, and not in the details of the hardware employed to scan the film. Accordingly, the structure, control and arrangement of conventional components and signal processing circuitry of which such a system is comprised have been illustrated in the drawings by readily understandable block diagrams which show only those specific details that are pertinent to the present invention, so as not to obscure the disclosure with structural details which will be readily apparent to those skilled in the art having the benefit of the description herein. Thus, the block diagram illustrations of the Figures do not necessarily represent the mechanical structural arrangement of the exemplary system, but are primarily intended to illustrate the major structural components of the system in a convenient functional grouping, whereby the present invention may be more readily understood.

The following is a general description of various features of the present invention which will be described in some detail later.

New Frame Edge Detection

Frame edges are assumed to occur across one scanline. That is, when traversing a film order, one scanline is viewed to be at Dmin (or gap) densities and the next scanline viewed is at densities of image levels. This assumption is not always the case. The reasons for this are many; non-square apertures in cameras, camera apertures with defects along the sides, film not butted tight against the aperture. These all contribute to the image frame imperfections. There are also system deficiencies which contribute to this problem; such as the red, green, and blue components are not being sampled at the same time. This leads to a phasing problem which tends to soften edges into three gradients across multiple scanlines.

This makes the job of finding edges more difficult to ascertain. When sufficient deltas are located (delta is the difference in the sum of all the red, green, and blue pixels across two adjacent scanlines), the previous scanline is often above the Dmin (or gap) density, thus failing the edge requirements (frame edges are rooted in Dmin/gap).

The present invention takes these conditions into consideration by expanding the search for Dmin (or gap densities) in an outward direction for a configurable number of lines. As long as the densities are monotonically decreasing to below the Dmin threshold within the configurable number of scanlines, the scanline whose delta is above the detail threshold is considered an edge.

More Accurate Tuning

Another aspect of the present invention is that it employs placing frames into different categories for the purpose of "tuning". Each category of frame relates to the method and rationale utilized to extract the frame from the film order. With this additional knowledge, this invention is better able to automatically tune the frames to the desired size. For example, if the frame was known to be extracted when both the leading and trailing edges were found, then a "center out" method of tuning would be employed. This would extract the center portion of the desired size (configurable) of the perceived frame. On the other hand, if just the leading edge were known when the frame was extracted from the film order, then the frame would be tuned biased to the leading edge, offset by the differences between the average well-formed frame (WFF) of the film order and the desired frame size divided by two. (Refer to detailed description in next section for more information).

Threshold Determination and Usage

A problem usually found with determining optimum threshold values to use in ascertaining features of a frame (i.e., frame edge). Many aspects of the system contribute to confounding this task; different film types, different film speeds, etc. There is also drift in the scanning system which may make a particular threshold acceptable at the beginning of the film order but not at the end. A feature of this invention determines a maximum and minimum set of threshold values for each threshold utilized and "walks" the thresholds up from the minimum to the maximum in iterative passes for those phases of the algorithm sensitive to threshold levels.

New Parsing and Sequencing Methodology

The methodology pertaining to the usage of the "well formed frame" concept, in accordance with this invention, provides an even more adaptive manner in which to detect frames. The previous design was based on finding a well-formed-frame and "chopping" frames from that point forward. This continues until the complete film order has been analyzed. Then a backward chop from the first WFF is performed. Once that avenue is exhausted, then the fit (spatial) and sort (signal) phases were performed. Each time a suspected frame is found, the edges are embellished to provide for a somewhat enlarged frame. The last phase of the algorithm would then tune the frames by choosing what it thinks is the "best" frame based on the scene content.

This invention would find all the WFFs of the order before performing a chop operation. This permits for a more accurate tuning to be performed since both edges are known and considered absolute. It also allows for the algorithm to then determine average frame size (as well as the largest and smallest) for a particular film order as well as a more accurate appraisal of the Dmin values for the gap. This provides more insight into the order to the chop procedure to find an edge and to tune those frames based on known frame sizes of the WFFs found. After finding all the WFFs a forward chop operation would be performed on all open areas of the order which could sustain complete frames starting at the end of the preceding WFF of each area. A backward chop operation would follow starting at the beginning of the next WFF for each area. These frames would be tuned based on the edge found and assuming the size to be the average WFF size. From this point on, the algorithm would operate the same as the current algorithm.

The following is a general outline of a method of detecting the locations of respective image frames contained on an image recording in accordance with this invention:

Reduce scan data to predictor space
Determine the minimum and maximum threshold set to be utilized for iterative phases of detection
For each set of thresholds:
  Find all the well formed frames in film order
  If frames were found:
    Determine the frame stats (minimum, maximum and average frame size, and the minimum, maximum and average gap size)
    Based on the frame stats, chop in a forward direction, starting from the end of each well formed frame found
    Based on the frame stats, chop in a backward direction, starting from the beginning of each well formed frame found
    Tune each of the "chopped" frames determined at this time
If no frames were found in the previous steps:
Establish default frame parameters
If frames were found in the previous steps:
For each set of thresholds
  Look at all remaining regions of the film order which have not been declared as frames. If any such region can support an integral number of frames where proposed edges are at or less than the current Dmin threshold, then add each frame to the frame list based on the established frame stats
Perform "Sort" operation same as original algorithm (additional case: butted frames)
Adjust the size of each frame detected to conform to the required size of the system requirements.

FIG. 1 diagrammatically illustrates a digital image processing system (e.g. photofinishing minilab) for processing photographic color images, such as those captured on one or more strips of color photographic film by a still (e.g. 35 mm) camera, with which the present invention may be employed. For purposes of the present description, such a system may be of the type described in the U.S. Pat. No. 5,157,482, issued Oct. 20, 1992, entitled "Use of Pre-scanned Low Resolution Imagery Data for Synchronizing Application of Respective Scene Balance Mapping Mechanisms During High Resolution Rescan of Successive Images Frames on a Continuous Film Strip," by P. Cosgrove, assigned to the assignee of the present application and the disclosure of which is herein incorporated. It should be observed, however, that the digital image processing system described in the '482 patent is merely an example of one type of a highly automated digital image processing system, in which the image frame detection mechanism of the present invention may be used, and is not to be considered limitative of the invention. In general, the present invention may be incorporated in any digitized image processing and reproduction system, where detection of images that are spatially arranged in sequence on an image capture medium is required.

In the digital image processing system described in the '482 patent, successive image frames of a continuous reel of color photographic film, such as a spliced-together sequence of 35 mm film strips, are pre-scanned by a digitizing scanner at a low spatial resolution, in order to derive information for calibrating the operation of the scanner during a subsequent high spatial resolution scan. More particularly, each digitized low resolution image is initially processed by a scene balance mechanism for deriving control information to be used for optimizing the manner in which a subsequently scanned, high spatial resolution digitized image is to be mapped into memory. The output of this analysis is used to calibrate the sensitivity parameters of the scanner during the high spatial resolution scan, so that the essential subject matter of the image which is necessary to reproduce a high quality image will fall within the linear portion of the response range of the scanner's imaging pixel array. The high spatial resolution digitized image is then processed by the scene balance mechanism to map the image data into a digitized image having a reduced encoding resolution corresponding to that of an attendant framestore.

Each high spatial resolution digital image processed and output by the system is stored in a portable multi-image database, such as a photographic image-containing compact disc (Photo CD), in the form of a respective digital image data file containing a low, or base, spatial resolution image bit map file and a plurality of successively higher spatial resolution residual images associated with respectively increasing degrees of spatial resolution of the image. By iteratively combining these higher spatial resolution residual images with the base resolution image, successively increased spatial resolution images may be recovered from the base resolution image.

As an example, spatial data values representative of a high resolution (3072×2048) image scan of a 36 mm-by-24 mm image frame of a 35 mm film strip may be stored as a respective image data file, including a base resolution image bit map file containing data values associated with a spatial image array or matrix of 512 rows and 768 columns of pixels, and an associated set of residual image files to be stored on the compact disc.

Within the photofinishing workstation, the base resolution image may be further sub-sampled to derive an even lower resolution sub-array of image values (e.g. on the order of 128×192 pixels) for use by the photofinishing operator in the course of formatting and storing a digitized image file. For purposes of the present description, the spatial parameters of such a sub-sampled base image (i.e. 192 lines by 128 pixels per line) will be considered to be those of a respective 'nominally whole image frame', which the frame detection mechanism of the present invention is operative to extract from a sequence of image frames contained on a continuous film strip, which has been scanned, digitized and stored in a digital image database. In the digital image processing system of FIG. 1, color photographic images 11, such as a set of twenty-four or thirty-six 36 mm-by-24 mm image frames of a 35 mm color film strip 10, may be scanned by a high resolution opto-electronic color film scanner 12, such as a commercially available Eikonix Model 1435 scanner.

The transport of the film strip in the course of the scanning operation is diagrammatically illustrated in FIG. 2. As the film strip 10 is transported from a supply reel 21 to a take-up reel 23, under the control of a film advance unit 17, high resolution film scanner 12 outputs, to an attendant workstation 14, digitally encoded data representative of the response of its imaging sensor pixel array (e.g. a 2048×3072 pixel matrix) to the contents of film strip 10 as projected by an input imaging lens system 13.

The digitally encoded data is representative of the contents of spatially separated scanlines 25, each scanline traversing the film strip in a direction generally transverse to its transport direction past the scanner's imaging optics 13, so that each scanline 25 effectively extends 'across' the film strip 10, as shown in FIG. 3. Each scanline 25 has a prescribed spatial resolution (being comprised of a prescribed number of pixels (e.g. 128 pixels) as defined by the sensor parameters of the scanner 12) and is effectively representative of whatever scanner 12 sees as the film strip 10 is transported past the film gate of the scanner's projection optics 13.

As film strip 10 is advanced past the viewing optics 13 of scanner 12, the scanner outputs digital data representative of each scanline 25, encoded to a prescribed digital resolution for each of the (128) pixels in the scanline, and supplies the digital scanline data to processor 14 for storage in memory. It is this digital scanline data that is applied as the input to the frame detection mechanism of the present invention. The frame detection mechanism then analyzes the scanline data for an entire film strip, from beginning to end, and produces a list of pointers that identify where, within the digitized film strip database, as output by the scanner and currently resident in memory in the digital image workstation, all of the image frames that it has determined contain valid image frame data from which an acceptable 'nominally whole' image frame can be produced by the attendant digital image processing system (e.g. into a Photo CD image), are located.

Because film-advance mechanisms for still cameras are customarily intended to operate such that they translate a loaded strip of film in a manner that causes successive image frames 11 to be spatially separated from one another by unexposed (Dmin) interframe gaps, diagrammatically illustrated at 17 in FIG. 3, the beginning (leading edge) 31 and the end (trailing edge) 33 of a frame may be identified by the locations of such gaps, so as to facilitate aligning successive frames on the film strip with the viewing optics of the scanner. Namely, a frame edge (leading or trailing) has its value based upon Dmin. For an ideal frame of a Indeed, as pointed out above, the film slippage compensation mechanism described in the U.S. Patent to Benker et al, No. 4,947,205, proposes employing interframe gaps for the purpose of film slippage compensation, and assumes that the captured image frames are well formed and properly spaced apart by such periodically spaced interframe gaps.

Unfortunately, because it is not always the case that successive images on a continuous film strip are equally spaced apart from one another, nor is it always the case that the content of an image frame immediately adjacent to an interframe gap is at a signal modulance level different from Dmin, the compensation mechanism of the Benker et al '205 is neither a complete, nor a predictably successful solution to the problem of accurately locating all image frames that may be contained on a film strip.

More particularly, it often occurs that two or more image frames on a film strip overlap each other (for example, if the film has been rewound by the camera user), as diagrammatically illustrated at 35 in FIG. 3. Also the captured image (modulance) contents of an image frame may be such that the modulance cannot be distinguished from non-exposed (interframe-gap) portions of the film (for example, a night-time fireworks image, where the principal portion of the image frame surrounding the fireworks display is effectively in darkness). In this latter case, the interframe gap and the image frame itself effectively blend together, as shown at 37.

In each of these circumstances, just as in the ideal case of well formed images periodically separated by interframe gaps, the film strip contains image frames the locations of which must be accurately detected, if such frames are to be successfully extracted for application to the digital image processing system. Rather than operate on the basis of an assumed a priori ideal case that all images are well defined and periodically separated from one another by interframe gaps (as in the '205 patent), the present invention makes no a priori assumptions as to where images are located or how many images may be contained on the film strip. Instead, the invention examines the entirety of the contents of the film strip to locate and readily extract, to the extent possible, each and every image frame that is capable of being successfully processed into an output digital image for storage on a Photo CD by the digital image processing system, so as to maximize the productivity of the high resolution image scanning process.

As noted above, and as will be described in detail below, the frame detection mechanism of the present invention is operative to produce a list of address space pointers which point to where, within the digitized film strip database, all of the image frames, that are contained on said film strip and have been determined to be capable of producing acceptable images for processing by the digital image processing system into acceptable nominal output images for storage on a Photo CD, are located. Since the respective scanlines produced by the film scanner are associated with physical locations on the film, the scan controller uses the pointers produced by the frame detection mechanism to control the operation of the film scanner during the high spatial resolution rescan, so as to precisely align the operation of the film gate with successive image frame-containing locations on the film.

As stated earlier, the input to the frame detection mechanism of the present invention is the digitized pixel data for each line output by scanner 12 and stored in memory resident in workstation 14. Although it is possible to operate directly upon the pixel data associated with each successive scanline, the present invention transforms the pixel data for respective scanlines into a set of 'predictors', listed below, which are associated with image frame parameters that more directly represent those attributes of an image frame necessary in order to conclude where, on the film strip, valid image frames are located. By using predictors, rather than the raw digital data, a considerable savings in processing time and a reduction in computational complexity are realized. Associated with the predictors is a set of thresholds with respect to which predictor comparisons are performed.

PREDICTORS

NEUTRAL: represents the density of a respective scanline pixel [i] and is denoted as:

$$\text{Neutral}[i] = \{\text{red pixel}[i] + \text{green pixel}[i] + \text{blue pixel}[i]\}$$

FIG. 4 diagrammatically illustrates a pixel triad P[i] that defines a respective scanline pixel [i] within an arbitrary scanline j, comprised of a red pixel R, a blue pixel B and a green pixel G.

SUM: characterizes the 'image content' or 'signal strength' of a respective scanline j, and is used to calculate Dmin, ascertain interframe gaps at frame edges, etc. The number of pixels in a scanline is dependent upon the parameters of the scanner and the film type specified. (As noted earlier, for the present description a nominal scanline contains 128 pixels.) SUM is denoted as:

$$\text{Sum[row]} = \sum_{\text{col}=1}^{\text{Scanline Length}} \text{Neutral[row][col]}$$

Thus, as shown in FIG. 5, for scanline j, the value SUM represents the resultant neutral value obtained by summing the respective neutral values associated with each of the RGB triads P[i], P[i+1], ..., P[i+n] of which scanline j is comprised.

VARIATION: characterizes a change in signal strength for a respective scanline j and is employed in tuning oversized and undersized image frames to nominal image frame size. Undersized image frame regions are enlarged or 'grown' to nominal size by incrementally adding scanlines in the direction of which side of the image frame exhibits the larger variation. VARIATION is denoted as:

$$\text{Variation[row]} = \sum_{\text{col}=1}^{\text{Scanline Length}} ABS(\text{Neutral[row][col]} - \text{Neutral[row][col} - 1])$$

Thus, as shown in FIG. 6, for scanline j, the value VARIATION represents the absolute value of the result of summing respective differences between RGB triads of adjacent scanlines, i.e. between P[i] of scanline j and P[i] of scanline j+1, through P[i+n] of scanline j and P[i+n] of scanline j+1.

PREVIOUS DELTA: characterizes a change in signal strength (SUM) between immediately adjacent (successive) scanlines j−1 and j. Thus as shown, in FIG. 7, PREVIOUS DELTA for scanline j is defined as:

$$\text{PREVIOUS DELTA} = \text{SUM}[j] - \text{SUM}[j-1].$$

Figure 8:
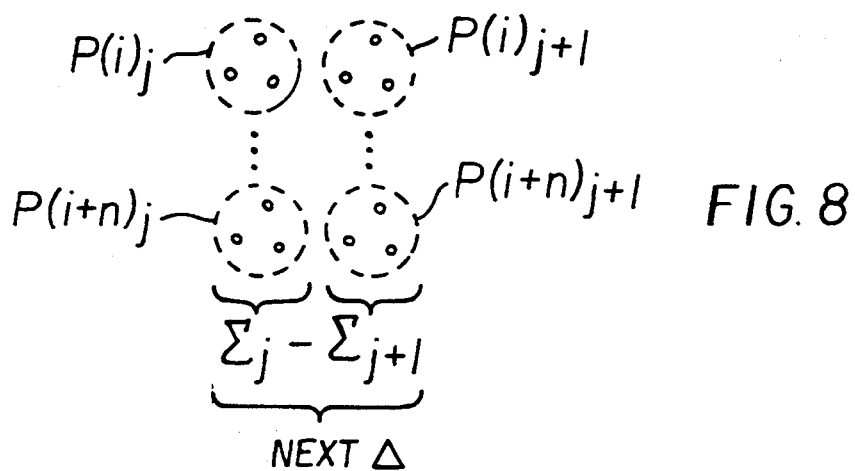
FIG. 8 diagrammatically illustrates the difference in sums for a NEXT DELTA for scanline j as NEXT DELTA=SUM[j+1]−SUM[j]

NEXT DELTA: characterizes a change in signal strength (SUM) between immediately adjacent (successive) scanlines j and j+1. Thus as shown, in FIG. 8, NEXT DELTA for scanline j is defined as:

$$\text{NEXT DELTA} = \text{SUM}[j+1] - \text{SUM}[j].$$

Figure 9:
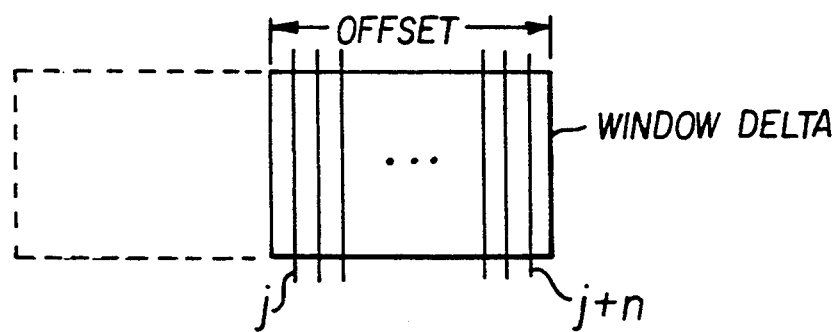
FIG. 9 diagrammatically illustrates WINDOW DELTA as a spatial differential between a given scanline j and another scanline j+k spatially displaced from the scanline j by the value of the window delta.

WINDOW DELTA: a measure to determine, in conjunction with a 'validity' threshold (defined below in the list of THRESHOLDS), whether a particular scanline j will be used in the calculation of adaptive thresholds. WINDOW DELTA is diagrammatically illustrated in FIG. 9 as a spatial differential between a given scanline j and another scanline j+k offset or spatially displaced from the scanline of interest by the value of the window delta. WINDOW DELTA is defined as:

Window Delta[row] =

$$\sum_{\text{offset}=-\text{Range}}^{\text{Range}} ABS(\text{Next Delta[row + offset]})$$

THRESHOLDS

Thresholds are limits that aid in detecting and defining the properties of image frames within a given film strip data base. There are two classes of thresholds: adaptive and non-adaptive. Adaptive thresholds are dependent upon actual scanline data within the film scan order (the sequence of scanlines along the entirety of the image capture medium (e.g. along the length of a continuous film strip)), and thereby allow the frame detection mechanism to adjust itself to variations in characteristics of the exposed film (e.g. exposed frame size, gap density, etc.). Non-adaptive thresholds are thresholds that are independent of the scanline data, and have been empirically determined to not change the effectiveness of the frame detection mechanism.

The three major thresholds are Dmin (gap) threshold, signal threshold, and delta threshold. These thresholds are derived from histograms generated from the prescan data representing the cumulative density (predictor). Each of these thresholds are determined by taking the value at the histogram representing a particular percentile of the associated predictor space as defined below. The percentile used for each threshold was derived from predetermined statistics which were acquired from a large data base of prescanned film orders.

Validity Threshold: A ('filtering') value which determines whether or not a particular scanline j will be permitted to participate in calculating those thresholds which are adaptive (designated below). This selective removal operation is carried out by summing the absolute values of the differences between adjacent scanlines within a window of scanlines centered on the scanline j under consideration and comparing the resultant sum against the validity threshold. Only if the sum is greater than the validity threshold will the scanline be used to establish adaptive thresholds. Namely, the validity threshold is employed to remove data where no significant information exists (such as film leader, unexposed or fogged areas of the film, for example), so as to not distort the image frame histogram data.

Delta Threshold (Adaptive): A value where the lower x % (e.g. the 'x' default for negatives is 60%) of the previous delta population occurs. Any scanline delta exceeding the delta threshold is a potential frame edge.

Dmin Threshold (Adaptive): A value where a prescribed percentage (e.g. the lower 6% (default)) of the scanline sum population occurs. Like the delta threshold, the Dmin threshold is also used in locating frame edges. Any scanline value lower than the Dmin threshold is considered unexposed.

Region-size Threshold: The minimum number of scanlines used to define a region and is a percentage of the value Frame Width.

Signal Threshold (Adaptive): A value where a prescribed percentage (e.g. the lower 8% (default)) of the scanline sum population occurs. This threshold is used to determine if a particular scanline contains modulance. Any scanline above this threshold is considered to be exposed and part of a frame.

Gap (Min/Max) (Adaptive): Specifies the size of an interframe gap and is derived after all of the most obvious frames in the film order have been identified.

Frame Width (Min/Max) (Adaptive): Specifies the frame-size range of the film order and is derived after all of the most obvious frames in the film order have been identified.

ITERATIVE IMAGE FRAME SEARCH PROCESS

As described briefly above, the frame detection mechanism in accordance with the present invention involves an iterative search process through the digitized image database resulting from the scanning of the continuous image captured medium (film strip), beginning with a Phase I search for 'well formed' frames, namely regions of the film strip that possess prescribed image content and frame boundary parameters, which permits such regions to be readily identified with a desired 'nominally whole image frame'. (As noted earlier, for purposes of providing a non-limitative example, a 'nominally whole' image frame is an image frame having a spatial resolution of 192 lines by 128 pixels per line.)

SYSTEM INITIALIZATION

Prior to initiating the search process, scanned data processing parameters are initialized in accordance with the preliminary processing flow diagrammatically illustrated in the flow chart diagram of FIG. 10. More particularly, at Step 101 of FIG. 10, any database scanline data that has resulted from operating the scanner prior to or subsequent to the presence of the image capture medium (film strip 10) within the film gate, is deleted from memory, so that the input to the frame detection mechanism of the present invention will contain only the contents of the film strip 10. Data from any other source (e.g. free space or non-film background is inherently erroneous and would otherwise skew valid data). Consequently, unless the scanline data is that associated with a scanline of the film strip, it is preliminarily excised from the database.

Following step 101, statistical predictor arrays associated with the predictors set forth above are allocated in memory. If the film strip is positive film, the data must be inverted. For this purpose, if the answer to positive film query step 103 is YES, the data is inverted in step 105, and the process proceeds to step 107, where the set of predictors is generated. If the film is negative (the answer to query step 103 is NO), the process proceeds to directly to step 107, to generated the set of predictors.

In step 111, memory is allocated for the delta arrays and respective next and previous delta predictors are generated. In step 113, any uninitialized system configuration settings are set with default values and any scanlines which are not to be included as part of the analyzed database are identified. To further reduce computational intensity, a histogram for each predictor set is generated in step 115. Finally, in step 117, each of the adaptive thresholds is determined in accordance with the system configuration and the predictor set histograms.

PHASE I (SEARCH FOR ALL WELL FORMED FRAME)

Figure 11:
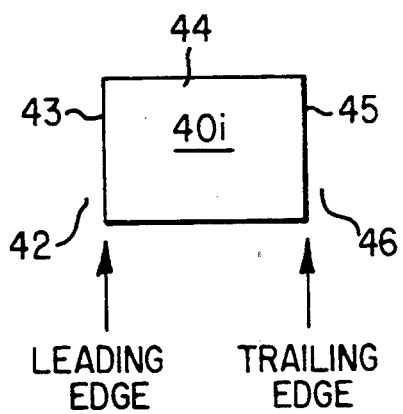
FIG. 11 diagrammatically illustrates the spatial components of a well formed frame.

A well formed frame is diagrammatically illustrated in FIG. 11 as comprising the spatial film data sequence consisting of a first gap 42, a leading edge 43 (of the well formed frame of interest 40i), frame image data 44, a trailing edge 45 (of the well formed frame of interest 40i), and an interframe gap 46.

During the Phase I search for all well formed frames, the following is a general description of the iterative process used. The lowest value for each threshold is computed and the thresholds are established as follows. As stated in the previous section, determining the proper threshold is a difficult task to ascertain. If the threshold is off on one side, the sensitivity of the system is decreased; if it's off on the other side it may be too restrictive and not yield the results required. To alleviate this problem and gain some flexibility and latitude in the threshold determination, this algorithm selects a minimum and maximum possible threshold for a given film order and performs an iterative evaluation of a particular phase that is sensitive to threshold values. The number of iterations and what threshold level to use in each iteration are both configurable. The default is four iterations with the thresholds set as follows:

Iteration 1: threshold=minimum+(20%)(maximum-minimum)
Iteration 2: threshold=minimum+(40%)(maximum-minimum)
Iteration 3: threshold=minimum+(70%)(maximum-minimum)
Iteration 4: threshold=minimum+(100%)(maximum-minimum)

Thereafter all the well formed frames (WFFs) are found for this particular set of threshold in the film order. If frames were found then the frame statistics of well formed frames are calculated (minimum, maximum, average gap size and frame size). Now a forward chop in each area between WWFs which can support frames. Thereafter a backward chop between WWFs in a similar manner. This process is continued iteratively until all the frames are identified iteratively for each set of thresholds established above.

If no frames were established then default parameters are determined for minimum, maximum, average gap size and frame size. At this point Phase II frame detection is performed.

PHASE II (FITTED SEARCH)

After completing Phase I processing, the methodology of the present invention proceeds to a Phase II ('fitted image frame') procedure, which looks to see if any of the thus far 'ambiguous'-labelled portions of the film strip between chopped image frames has a spatial size that will allow a 'fitting' of an integral number of image frames, each of which has a size sufficient to accommodate an image frame region whose size is the average of that of a well formed frame detected in Phase I, and which is bounded by a pair of interframe gaps whose dimensions are those of the interframe gaps of a well formed frame. The following process is performed on an iterative basis for each set of thresholds.

Figure 12:
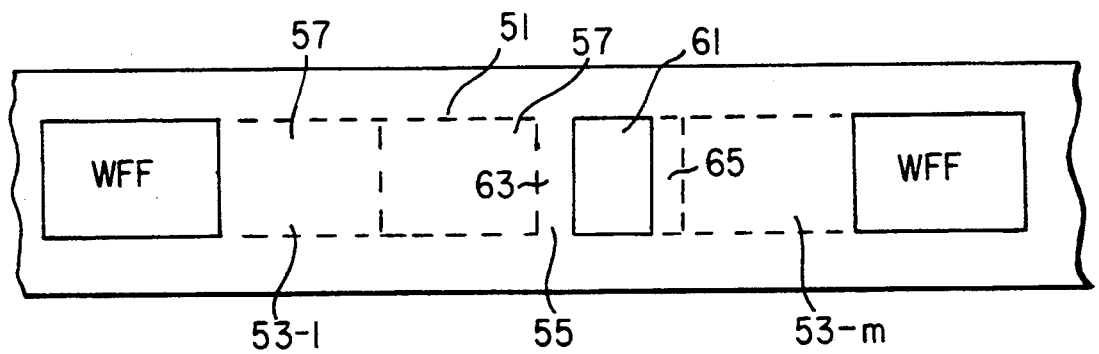
FIG. 12 diagrammatically illustrates the manner in which a film region that has been labelled as 'ambiguous' as a result of Phase I processing may accommodate an integral number of image frames.

Namely, as diagrammatically illustrated in FIG. 12, if the extent of a film region 51, that has been labelled as 'ambiguous', as a result of Phase I processing, is sufficient to accommodate an integral number of image frames 53-1 ... 53-m, then the potential image frame area 51 is subdivided into a grid 55, respective cells 57 of which correspond to the size of a 'standard size' image frame sufficient to accommodate an interior image modulance portion 61 bounded by a pair of interframe gap regions 63 and 65 on opposite sides thereof. In order to be identified as a valid frame, at least one scan line of the interior portion 61 of a respective cell 57 must contain image modulance ('signal') of at least a prescribed threshold (to be described) and each of its associated interframe gap regions 63 and 65 must have a gap-like (Dmin) density characteristic. Each cell of a subdivided ambiguous film strip area that has satisfied these two requirements is labelled as a valid frame and its identification (in terms of database pointers) is added to the list of frames that identified as well formed frames and those chopped from the database during Phase I processing. Any ambiguous portion of the film strip database that still remains after Phase II processing is next subjected to Phase III processing.

PHASE III (OVERSIZE, UNDERSIZE SORTING)

Upon completion of Phase II processing, the frame detection mechanism of the present invention proceeds to a Phase III (oversize, undersize sorting) procedure, which looks to see whether any of the still remaining 'ambiguous'-labelled portions of the film strip has a size sufficient to accommodate an image frame region and if the region contains modulance. If so, the region is classified according to its size and subjected to further processing based upon frame size classification.

Figure 13:
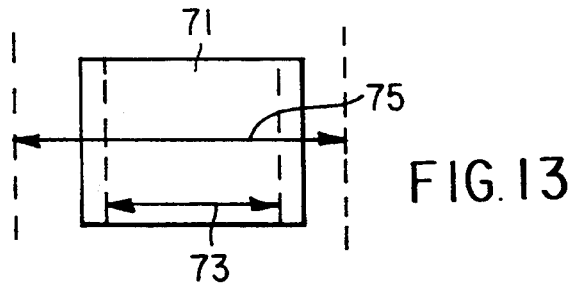
FIG. 13 diagrammatically illustrates a modulance-containing region being greater than or equal to a prescribed minimum frame size and less than or equal to a prescribed maximum frame size.

More specifically, as diagrammatically illustrated in FIG. 13, if the size of the modulance-containing region 71 is greater than or equal to a prescribed minimum frame size 73 and is less than or equal to a prescribed maximum frame size 75, then modulance-containing region 71 is labelled as a nominally acceptable frame and chopped from the film strip database to be included on the valid frame list thus far assembled in phases I and II of the frame detection mechanism.

Figure 14:
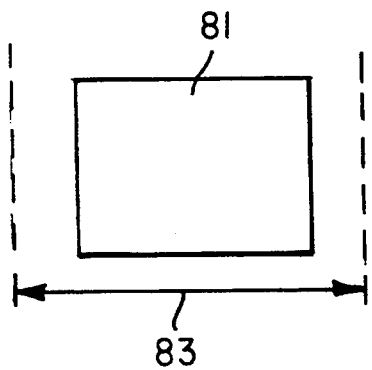
FIG. 14 shows a modulance-containing region being less than minimum frame size, as an 'undersized' frame to be subjected to undersize processing, so that it may be combined with another undersized frame.

On the other hand, as shown in FIG. 14, if the size of the modulance-containing region 81 is less than the minimum frame size 83, then the region is labelled as an 'undersized' frame and is subjected to undersize processing, so that, if possible, it may be combined with another undersized frame, as will be described.

Figures 15, 16, 17, 18:
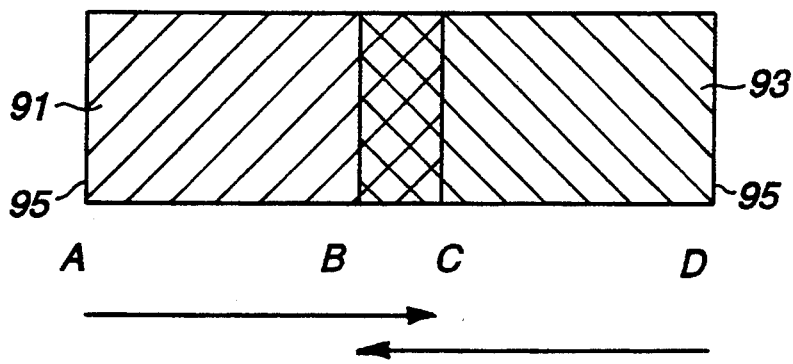
FIG. 15 diagrammatically illustrates a modulance-containing region overlapping another modulance-containing region.
FIG. 16 shows an "overlap 25" image frame.
FIG. 17 shows an "overlap 50" image frame.
FIG. 18 shows an "overlap 75" image frame.

If the size of the modulance-containing region is greater than maximum frame size, then the frame is 'oversized' and it is inferred that such an oversized frame is a combination of at least two frames, which needed to be partitioned or subdivided into respective 'stand-alone' image frames. For this purpose, a determination is made as to whether such an 'oversized' region is less than or equal to twice the maximum frame size. If the oversized region does not exceed twice the maximum frame, then it is inferred that the oversized region is a combination of only two images that overlap or abut one another, as diagrammatically illustrated in FIG. 15, which shows modulance-containing region 91 overlapping another modulance-containing region 93, the two regions 91, 93 being bounded by (Dmin) gaps 95. In this case, the dual region 91-93 is labelled as a 'simple' overlap image frame, which is subjected to further processing, to be described, in order to classify the degree or extent of overlap in preparation of further processing.

More particularly, the degree of overlap is defined as one of three categories: "overlap 25" shown in FIG. 16, where the region size is less than twice the maximum frame size but greater than or equal to 1.5 times maximum frame size (representative of a range of up to a 25% overlap of the two modulance-containing regions 91–93); "overlap 50" shown in FIG. 17, where the region size is less than 1.5 times the maximum frame size but greater than or equal to 1.25 times maximum frame size (representative of a range up to a 50% overlap of the two modulance-containing regions 91–93); and "overlap 75" shown in FIG. 18, where the region size is less than 1.25 times the maximum frame size, but greater than maximum frame size (representative of a range of up to a 75% overlap of the two modulance-containing regions 91–93). If the size of the oversized modulance-containing region is equal to or greater than two times the frame size and less than or equal to two times the maximum frame size then it is inferred that two images are directly abut one another. In this instance, we will create two frames, the first frame based on the lead edge of the oversized region and the second frame based on the trailing edge of the oversized modulance region.

Figure 19:
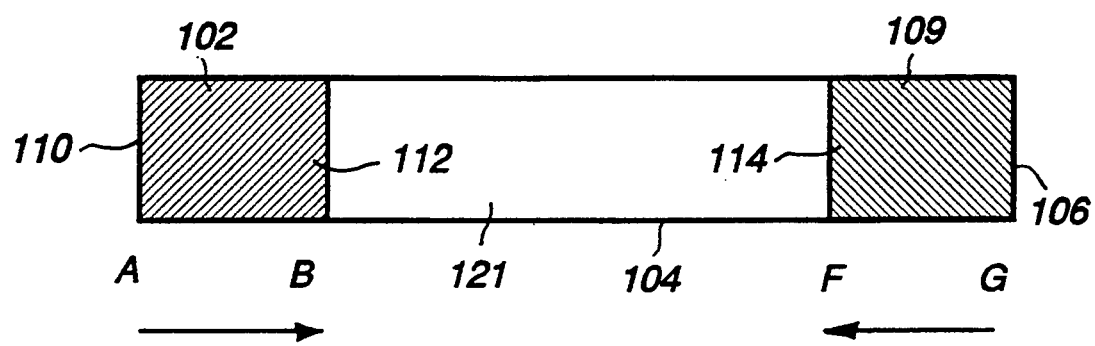
FIG. 19 diagrammatically illustrates the size of an oversized modulance-containing region being greater than twice the maximum frame size.
Figure 20:
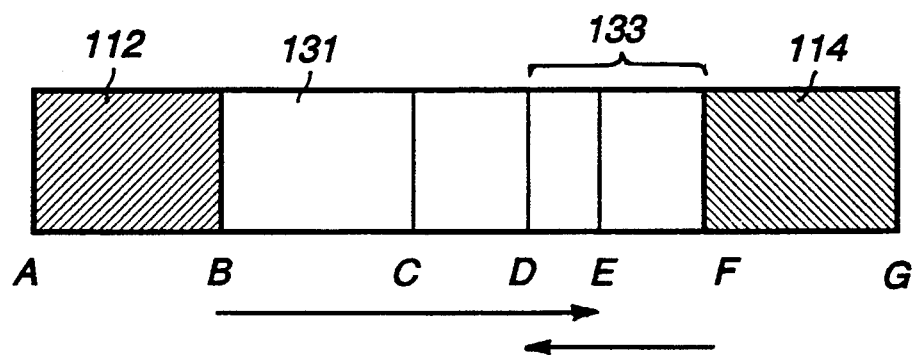
FIG. 20 shows a residual portion of an oversized image remaining after the excision of overlap regions further from its leading and trailing edges into further excised regions.

If the size of the oversized modulance-containing region is greater than twice the maximum frame size, then it is inferred that more than two images overlap one another, as diagrammatically illustrated in FIG. 19, wherein the oversized modulance-containing region 104 of interest overlaps two additional modulance-containing regions 102, 109. In this case the oversized region 102–104–109 is labelled as a 'multiple' overlap image frame, which is subjected to an edge-excision procedure that extracts a pair of images from each of the leading edge 110 and the trailing edge 106 of the oversized image region, denoted by regions 112 and 114 in FIG. 19. Each of the excised regions 112 and 114 is sized to fall within the overlap 25 category, described above. The residual portion 121 of the oversized image remaining after the excision of overlap 25 regions 112 and 114 is labelled as ambiguous and then further reduced, to the extent possible, from its leading and trailing edges into further excised regions 131, 133, as shown in FIG. 20. Namely, reduction of multiple oversized regions proceeds from the outside-in, from the leading and trailing edges, until the residual region is less than the maximum size of a nominal image frame. Such a residual image is denoted as ambiguous.

If the size of the modulance-containing region 81 is less than the minimum frame size, as shown in FIG. 14, referenced above, then the region is labelled as an 'undersized' frame, and an attempt is made to combine the undersized region with another, adjacent undersized region. Specifically, the undersized region of interest is merged or combined with one or more successively adjacent undersized regions as long as the size of the resulting merged region is no greater than the maximum size of a nominal image frame. Thus, with reference to FIG. 21, a pair of undersized regions 141 and 142 are shown as being mutually adjacent to one another, each being dimensioned less than the frame width of a maximum image frame. As a consequence, these two modulance-containing frame regions are combined into a single image frame 144. If the size of the resultant frame is less than maximum frame size an attempt is made to combine resultant image frame 144 with a further adjacent undersized modulation-containing region within the ambiguous portion of the film strip database under consideration. This process continues until it is determined that the resultant image frame will exceed maximum frame size. In this event, no further combining of undersized image frames with the frame of interest is conducted. If what remains is a single or plural non-combinable undersized images, such regions are labelled as ambiguous regions.

Once all oversized frames have been reduced and labelled and all undersized frames have been combined and labelled, they are added to the list of valid image frames. All remaining regions within the film strip database are labelled as ambiguous frames and are excluded from the list of valid images frames.

TUNING IMAGE FRAME SIZE

With a valid image list completed, the size of each image on the list is adjusted, as necessary, to conform with the size of a nominal image frame, e.g. a 128 pixel×192 pixel image frame. This operation, hereinafter referred to as 'tuning' of the image frame, serves to equate the size of each image with a prescribed base image size employed by the digital image processing system, in particular by the scene balance mechanism for deriving control information to be used for optimizing the manner in which a subsequently scanned high resolution digitized image is to be mapped into memory. As pointed out above, the result of such analysis is used to calibrate the sensitivity parameters of the film scanner during the high resolution scan, so that the essential subject matter of the image which is necessary to reproduce a high quality image will fall within the linear portion of the response range of the scanner's imaging pixel array.

Tuning of a respective image frame involves analyzing the size of a respective image to determine whether it matches the (128×192) size of a nominal image frame. If so there is no change. If the image is oversized, the size of the image is reduced or 'shrunk' to nominal. If the image is undersized, the size of the image is increased or 'grown' to nominal.

FIGS. 22 and 23 diagrammatically illustrate the manner in which an oversized image is reduced by an iterative scanline removal sequence. In particular, FIG. 22 illustrates an image 151 having an original size of 128 columns×198 scanlines of pixels. The respective scanlines are labelled columns SL0 . . . SL197, where scanline SL0 is associated with the leading or leftmost edge of the image, and scanline SL197 is associated with the trailing or rightmost edge of the image. Pursuant to the present invention, the variation between the contents of the leading edge scanline SL0 and its adjacent image scanline SL1 is compared with the variation between the contents of the trailing edge scanline SL197 and its adjacent image scanline SL196. For that pair of scanlines whose variation is smallest, the outermost or 'edge' scanline is excised from the image frame, so as to reduce the size of the image frame by one scanline. In the present example, assuming that the variation between the contents of the leading edge scanline SL0 and its adjacent image scanline SL1 is larger than the variation between the contents of the trailing edge scanline SL197 and its adjacent image scanline SL196, then scanline SL197 is discarded from the image frame and scanline SC196 becomes the new trailing edge of the image frame, as shown in FIG. 23. Let it next be assumed that, after discarding original trailing edge scanline 197, the variation between the contents of the leading edge scanline SL0 and its adjacent image scanline SL1 is now smaller than the variation between the contents of the new trailing edge scanline SL196 and its adjacent image scanline SL195. In this case, leading edge scanline SL0 is discarded from the image frame and scanline SL1 becomes the new leading edge of the image frame, as shown in FIG. 24. This process is repeated, as necessary, until the total number of scanlines corresponds to that of a nominal image (e.g. 192 scanlines). Once the total number of scanlines matches that (e.g. 192 scanlines) of a nominal image frame, no further adjustment in image frame size is performed and the image frame is considered to be tuned.

Figure 25:
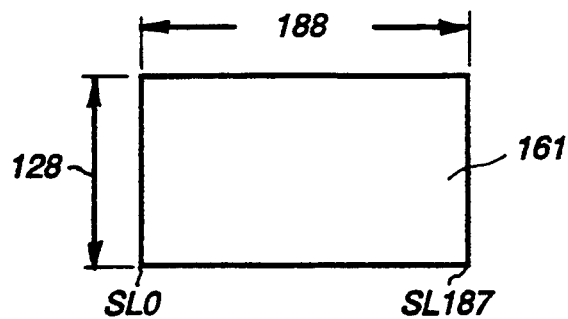
FIGS. 25 and 26 diagrammatically illustrate the manner in which an undersized image is 'grown' by an iterative scanline addition sequence.
Figure 26:
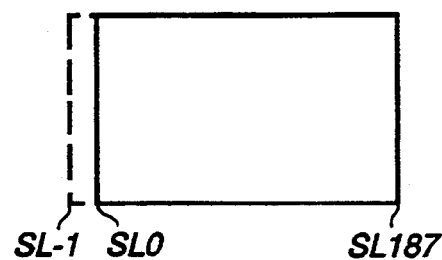

FIGS. 25 and 26 diagrammatically illustrate the manner in which an undersized image is 'grown' by an iterative scanline addition sequence. In particular, FIG. 25 illustrates an undersized image 161 having an original size of 128 columns × 188 scanlines of pixels. The respective scanlines are labelled columns SL0 ... SL187, where scanline SL0 is associated with the leading or leftmost edge of the image, and scanline SL187 is associated with the trailing or rightmost edge of the image frame. To grow an image frame, the variation between the contents of the leading edge scanline SL0 and its adjacent image scanline SL-1 outside of the undersized image frame is compared with the variation between the contents of the trailing edge scanline SL187 and its adjacent image scanline SL198 outside of the image frame. For that pair of scanlines whose variation is largest, the adjacent scanline outside of the image frame is added to the image frame, so as to increase the size of the image frame by one scanline. A caveat to this process is the requirement that the adjacent scanline to be added to the image frame cannot be part of an adjacent image frame. If it is, then the undersized image frame region is considered to be ambiguous and is labelled as such. In the present example, assuming that the variation between the contents of the leading edge scanline SL0 and its adjacent outside scanline SL-1 is larger than the variation between the contents of the trailing edge scanline SL187 and its adjacent image scanline SL198, then scanline SL-1 is added to the image frame and scanline SC-1 becomes the new leading edge of the image frame, as shown in FIG. 26. As in the case of iteratively reducing the size of an oversized image, this process is repeated, as necessary, until the total number of scanlines corresponds to that of a nominal image frame (e.g. 192 scanlines). Once the total number of scanlines matches that (e.g. 192 scanlines) of a nominal image frame, no further adjustment in image frame size is performed and the image frame is considered to be tuned.

As will be appreciated from the foregoing description of the frame detection mechanism of the present invention, rather than initially assume that all images are well defined and periodically separated from one another by equally sized interframe gaps, no prior assumption as to where images are located or how many images may be contained on the film strip is made. Instead, the invention examines the entirety of the contents of the film strip to accurately identify the location of every 'nominally whole' image frame that is capable of being successfully processed into an output digital image, in accordance with set of image frame identification operators, which iteratively identify locations of nominally valid frames, beginning with the identification of all well formed frames. Each well formed frame has prescribed image frame attributes including at least a spatial region of image modulance bounded by leading and trailing edges adjacent to Dmin interframe gaps. The iterative identification procedure includes 'chopping' less than well formed frames, sorting frame regions based upon geometry considerations and identifying and adjusting the size of oversized and undersize frames. To reduce computational complexity a set of image frame-based 'predictors' and an associated set of thresholds are used in the iterative search and sort process.

From the identification process, a list of address space pointers is produced, the address pointers pointing to where, within the digitized film strip database, all of the image frames, that are contained on said film strip and have been determined to be capable of producing acceptable images for processing by the digital image processing system into acceptable nominal output images for storage on a Photo CD, are located. Since the respective scanlines produced by the film scanner are associated with physical locations on the film, the scan controller uses the pointers produced by the frame detection mechanism to control the operation of the film scanner during the high spatial resolution rescan, so as to precisely align the operation of the film gate with successive image frame-containing locations on the film.

The following sets forth in more detail the Chop Logic, Frame Edge Detection Logic and Tuning Logic aspects of this invention.

After finding all the well formed frames in the order (for each iteration) succeeding frames may be detected with less stringent requirements. The logic within the Forward Chop and Backward Chop routines requires that at least one edge of a frame be detected and that the other end of the frame be at the Dmin or gap-like densities. Each of these frame attributes must be found within a range or window of scanlines or it is not deemed a frame and the search within that region is terminated.

DESCRIPTION

---

Chop
    From the beginning of the film order to the
    scanline before the first WFF, perform a Backward
    Chop
    For each interframe gap (region between two WFFs)
    which can support a complete frame:
        From the last scanline of the previous WFFs
        to the first scanline of the next WFF,
        perform a Forward Chop
        From the first scanline of the next WWF to
        the last scanline of the previous frame
        (which may be chopped from the last Forward
        Chop call), perform a Backward Chop
    From the end of the last WFF to the end of the
    film order, perform a Forward Chop

---

Forward Chop (start, end)
look = start
If (end - start) < frame size then
    status = DONE
Else
    status = LOOKING
While (status! = DONE)
    If a lead edge is found between look and look +
    look size scanlines then
        If (lead + frame size) > end then
            status = DONE
        Else there's still room for a frame
            If Dmin can be found between (lead edge +
            frame size) and (lead edge + frame
            size + look size) and there's modulance
            between then
                We've found a frame - add it to the
                list denoted as a lead edge frame
                look = end of new frame + minimum
                gap size
            Else there's no frames to be chopped -continued

```
            from this point
                status = DONE
            Else no lead edge was found
                If a trail edge is found between (look + frame
                size) and (look + frame size + look size) as well
                as < end then
                    If Dmin can be found between (trail edge
                    frame size - look size) and (trail edge
                    frame size) and there's modulance between
                    then
                        We've found a frame - add it to the list
                        denoted as a trail edge frame
                        look = end of new frame + minimum gap
                        size
                    Else there's no frames to be chopped from
                    this point
                        status = DONE
End-while
```

```
Backward Chop (start, end)
look = end
If (end - start) < frame size then
    status = DONE
Else
    status = LOOKING
    While (status! = DONE)
        If a trail edge is found between look and (look -
        look size) scanlines then
            If (trail - frame size) < start then
                status = DONE
            Else there's still room for a frame
                If Dmin can be found between (trail edge -
                frame size) and (trail edge - frame size -
                look size) and there's modulance between then
                    We've found a frame - add it to the list
                    denoted as a trail edge frame
                    look = end of new frame + minimum gap
                    size
                Else there's no frames to be chopped from
                this point
                    status = DONE
        Else no trail edge was found
            If a lead edge is found between (look - frame
            size) and (look frame size - lotuses) as well as >
            start then
                If Dmin can be found between (lead edge +
                frame size + look size) and (trail edge +
                frame size) and there's modulance between
                then
                    We've found a frame - add it to the list
                    denoted as a lead edge frame
                    look = end of new frame + minimum gap
                    size
                Else there's no frames to be chopped from
                this point
                    status = DONE
End-while
```

Frame Detection Logic

Two separate functions were created to detect either a leading edge or a trailing edge. It could have been performed via one function but was deemed better structure as two functions. The following describes each routine in detail:

```
Call structure:    Find Lead Edge
                   (Predictor Space Pointer, Start
                   Line, End Line)
Return Value:      Positive number signifies scanline
                   where first lead edge was deter-
                   mined within the specified range.
                   Negative value signifies no lead
                   edge was found within the specified
                   range.
```

```
Set Return Value = -1
For each scanline in the specified range
    If the Previous Delta > Delta Threshold
        For each scanline prior to the current
        scanline and within the configurable edge
        window
            If the Scanline Sum <= Dmin Threshold then
                Set Return Value = current scanline
            Else if the Scanline Sum > last Scanline Sum then
                The slope of the scanline sum has changed
                directions and the current scanline must not
                be a leading edge
            Do next scanline if no edge determined yet
            Do next scanline if no edge determined yet
Return (Return Value)
Call structure:    Find Trail Edge
                   (Predictor Space Pointer, Start
                   Line, End Line)
Return Value:      Positive number signifies scanline
                   where first trail edge was deter-
                   mined within the specified range.
                   Negative value signifies no trail
                   edge was found within the specified
                   range.
Set Return Value = -1
```

For each scanline in the specified range

```
If the Next Delta > Delta Threshold
    For each scanline after the current scanline
    and within the configurable edge window
        If the Scan Line Sum <= Dmin Threshold then
            Set Return Value = current scanline
        Else if the Scanline Sum > last Scanline Sum then
            The slope of the scanline sum has changed
            directions and the current scanline must not
            be a trailing edge
    Do next scanline if no edge determined yet
    Do next scanline if no edge determined yet
Return (Return Value)
```

Tuning Logic

There are two basic methods of reporting the starting and ending scanline of a frame. The first method is based on the whereabouts of an identifiable edge or edges. The other method is based on the modulation content at the end regions of each detected frame. In order to determine the best method to employ, information about how the frame was detected must be known. This data is preserved by labeling each detected frame as a particular frame type as it is created thus placing it into a category for optimal tuning. The Frame Detection Algorithm also adapts to the frame size for each individual film order by utilizing the average frame size of all the well formed frames to determine any offsets used in tuning those frames with "anchor" points (see below).

Currently there are eleven categories of frames. The categories and the tuning method are listed below:

TABLE 1

| FRAME CATEGORY AND TUNING METHOD | |
|---|---|
| Category | Method |
| Well Formed Frame | Edge-based (center out) |
| Lead Edge Chop | Edge-based (lead anchor) |
| Trail Edge Chop | Edge-based (trail anchor) |
| Fitted Frame | Modulation-based |
| Sorted Frame | Modulation-based |
| Butted Frame | Edge-based (double anchor) |
| Overlap 25 | N/A |
| Overlap 50 | N/A |
| Overlap 75 | N/A |
| Undersized | Modulation-based |

TABLE 1-continued

FRAME CATEGORY AND TUNING METHOD

| Category | Method |
|---|---|
| Ambiguous | N/A |

TUNING METHOD DEFINITIONS

TUNING METHOD DEFINITIONS
Edge-Based

| Key: | Rfle: | Reported Frame Lead Edge |
|---|---|---|
| | Rfte: | Reported Frame Trail Edge |
| | Dfle: | Detected Frame Lead Edge |
| | Dfte: | Detected Frame Trail Edge |
| | Rfs: | Requested/Reported Frame size |
| | AvgWFF: | Average Well Formed Frame size |

Center-Out (extract center portion)
  Rfle = Dfle + ((Dfte − Dfle + 1) − Rfs)/2
  Rfte = Rfle + Rfs − 1
Lead Anchor (extract based on lead edge)
  Rfle = Dfle + (AvgWFF − Rfs)/2
  Rfte = Rfle + Rfs − 1
Trail Anchor (extract based on trail edge)
  Rfte = Dfte − (AvgWFF − Rfs)/2
  Rfle = Rfte − Rfs + 1
Double Anchor (extract first butted frame based on lead edge and extract the second butted frame based on the trail edge)
  First Frame Rfle = Dfle + (((Dfte − Dfle + 1)/2) − Rfs)/2
  First Frame Rfte = Rfle + Rfs − 1
  Second Frame Rfte = Dfte − (((Dfte − Dfle + 1)/2) − Rfs)/2
  Second Frame Rfle = Rfte − Rfs + 1

---

Modulation Based

Formulas:
For each pixel (i)
  Neutral [i] = red[i] + green[i] + blue[i]
For each scanline (j)

$$\text{variation}[j] = \sum_{i=1}^{\text{Scanline Length}} \text{ABS}(\text{Neutral}[i][j] - \text{Neutral}[i][j-1])$$

Enlarging an undersized region:
  Region Size = Dfte − Dfle + l
  Until Region Size = Reported/Requested frame size
Do
  If variation [Dfle] > variation [Dfte + 1]
  then lead has more modulation than trail -
  grow the frame in direction of the lead edge
    Dfle = Dfle − 1
  Else
    Trail has more modulation than lead -
    grow the frame in the direction of the
    trail edge
      Dfte = Dfte + 1
Reducing an oversized region:
  Region Size = Dfle − Dfle + l
  Until Region Size = Reported/Requested frame size
Do
  If variation [Dfle] > variation [Dfte + 1]
  then lead has more modulation than trail -
  shrink the frame from the trail edge
    Dfte = Dfte − 1
  Else
    Trail has more modulation than lead-
    shrink the frame from the lead edge
      Dfle = Dfle + l While there is described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

PARTS LIST:

| | |
|---|---|
| 10 | Film strip |
| 11 | Photographic images |
| 12 | Film scanner |
| 13 | Imaging optics |
| 14 | Workstation/processor |
| 16 | Display |
| 17 | Film Advance Unit |
| 18 | Digital to analog converter |
| 19 | Interframe gap |
| 21 | Supply reel |
| 23 | Take-up reel |
| 25 | Scanline |
| 31 | Frame leading edge |
| 33 | Frame trailing edge |
| 35 | Image frame overlap |
| 37 | Frame with no discernible edge |
| 40i-1 | Previous image frame |
| 42 | Interframe gap |
| 43 | Leading edge |
| 44 | Frame image data |
| 45 | Trailing edge |
| 46 | Interframe gap |
| 47 | Leading edge |
| 51 | Film region/image frame area |
| 53-1 | Image frame |
| 53-m | Image frame |
| 55 | Grid |
| 57 | Respective cell |
| 61 | Interior image modulance portion |
| 63 | Interframe gap region |
| 65 | Interframe gap region |
| 71 | Modulance-containing region |
| 73 | Prescribed minimum frame size |
| 75 | Prescribed maximum frame size |
| 81 | Modulance-containing region |
| 83 | minimum frame size |
| 91 | Modulance-containing region |
| 93 | Modulance-containing region |
| 95 | Gap |
| 101 | Eliminating step |
| 102 | Modulance-containing region |
| 103 | Creating predictor arrays |
| 104 | Oversized modulalice-containing region |
| 105 | Normalizing stat predictor |
| 106 | Trailing edge |
| 107 | Generating stat predictor |
| 109 | modulance-containing region |
| 110 | Leading edge |
| 111 | Memory allocation and generating step |
| 112 | Region |
| 113 | Installing the defaults for uninitialized configuration settings |
| 114 | Region |
| 115 | Generating a histogram |
| 117 | Determining adaptive thresholds |
| 121 | Residual portion |
| 131 | Regions |
| 133 | Regions |
| 141 | Undersized regions |
| 142 | Undersized regions |
| 144 | Image frame |
| 151 | Image |
| 161 | Undersized image |

What is claimed is:
1. A method of detecting the locations of respective image frames contained on an image recording medium, comprising the steps of:
  (a) scanning said image recording medium so as to produce digital pixel data representative of the contents of each successive scan line of said image recording medium;

(b) processing such scanned digital pixel data in accordance with predetermined equations, including a scan line sum predictor equations and at least one of a previous delta predictor equation and a next delta predictor equation to generate a predictor space for frame identifiers;

(c) producing a series of thresholds based upon a predetermined percentile of the predictor space;

(d) determining all the well formed image frames based upon the thresholds; and (e) using the determined well formed image frames to produce frame statistics which are used to detect the location of image frames other than the well formed image frames.

2. A method of detecting the locations of respective image frames contained on an image recording medium, comprising the steps of:

(a) scanning said image recording medium so as to produce digital pixel data representative of the contents of each successive scan line of said image recording medium;

(b) processing such scanned digital pixel data in accordance with predetermined equations to generate a predictor space for frame identifiers;

(c) producing a series of thresholds based upon a predetermined percentile of the predictor space;

(d) determining all the well formed image frames based upon the thresholds; and (e) using the determined well formed image frames to produce frame statistics which are used to detect the location of image frames other than the well formed image frames wherein the predictor space predetermined equations include scan line sums, neutral, variation, next delta, window delta, and previous delta predictors based on comparison of adjacent scan line sums equations.

3. The method of claim 2 wherein the predetermined statistics includes a calculation of cummulative predictor percentile.

4. The method of claim 2 wherein the frame statistics are the minimum, maximum and average frame size and the minimum, maximum and average gap size between well formed image frames.

5. The method of claim 3 including calculating frame statistics based on minimum, maximum and average frame size and gap size, and proceeding forwardly and rearwardly using the frame statistics to locate frames which are characterized by only one edge.

6. The method of claim 3 including adjusting the size of all determined frames to be the same as a nominal image frame to a size which is based upon the need of a user device.

7. The method of claim 2 wherein the thresholds include minimum and maximum set of thresholds and the thresholds are iteratively increased from the minimum to the maximum to search for unidentified frames.

8. The method of claim 2 further including the steps of determining leading and trailing frame edges, and determining frames which abut each other without a gap between them based upon the leading edge of a first frame and the trailing edge of a second frame.

9. The method of claim 2 including the step of detecting frame edges which traverse multiple scan lines by using digital pixel density changes in multiple scan lines.

10. An apparatus for detecting the locations of respective image frames contained on an image recording medium comprising:

(a) means for scanning said image recording medium so as to produce digital pixel data representative of the contents of each successive scan line of said image recording medium;

(b) means for processing such scanned digital pixel data in accordance with predetermined equations, including a scan line sum predictor equations and at least one of a previous delta predictor equation and a next delta predictor equation to generate a predictor space for frame identifiers;

(c) means for producing a series of thresholds based upon a predetermined percentile of the predictor space; and (d) means for determining all the well formed image frames based upon the thresholds and using the determined well formed image frames to produce frame statistics which are used to detect the location of image frames other than the well formed image frames.

11. An apparatus for detecting the locations of respective image frames contained on an image recording medium comprising:

(a) means for scanning said image recording medium so as to produce digital pixel data representative of the contents of each successive scan line of said image recording medium;

(b) means for processing such scanned digital pixel data in accordance with predetermined equations to generate a predictor space for frame identifiers;

(c) means for producing a series of thresholds based upon a predetermined percentile of the predictor space; and (d) means for determining all the well formed image frames based upon the thresholds and using the determined well formed image frames to produce frame statistics which are used to detect the location of image frames other than the well formed image frames;

wherein the predictor space predetermined equations include scan line sums, neutral, variation, next delta, window delta, and previous delta predictors equations.

12. An apparatus as claimed in claim 11, wherein the frame statistics are a minimum, maximum and average frame size and a minimum, maximum and average gap size between will formed image frames.

13. An apparatus as claimed in claim 12 further comprising means for calculating statistics based on minimum, maximum and average frame size and gap size, and means for using the frame statistics to locate frames which are characterized by only one edge.

14. An apparatus as claimed in claim 13, further comprising means for adjusting the size of all determined frames to be the same as a nominal image frame to a size which is based upon the need of a user device.

15. An apparatus as claimed in claim 11, wherein the thresholds include minimum and maximum set of thresholds and the thresholds are iteratively increased from the minimum to the maximum to search for unidentified frames.

16. An apparatus as claimed in claim 11 further comprising means for determining leading and trailing frame edges, and determining frames which abut each other without a gap between them based upon the leading edge of a first frame and the trailing edge of a second frame.

17. An apparatus as claimed in claim 11 further comprising means for detecting frame edges which traverse multiple scan lines by using digital pixel density changes in multiple scan lines.

* * * * *